United States Patent [19]

Kawakami et al.

[11] Patent Number: 5,510,855
[45] Date of Patent: Apr. 23, 1996

[54] SATELLITE TELEVISION BROADCASTING RECEIVER INCLUDING IMPROVED CLAMPING CIRCUIT

[75] Inventors: Shigeru Kawakami, Suita; Noriaki Omoto; Toshihiro Shogaki, both of Takatsuki, all of Japan

[73] Assignee: Matsushita Electric Industrial Co., Ltd., Osaka, Japan

[21] Appl. No.: 424,568

[22] Filed: Apr. 17, 1995

Related U.S. Application Data

[63] Continuation of Ser. No. 286,226, Aug. 5, 1994, abandoned, which is a continuation of Ser. No. 897,676, Jun. 12, 1992, abandoned.

[30] Foreign Application Priority Data

Jun. 18, 1991 [JP] Japan ................................. 3-145822
Jan. 29, 1992 [JP] Japan ................................. 4-013521

[51] Int. Cl.$^6$ ............................ H04N 5/18; H04N 5/44
[52] U.S. Cl. ...................... 348/695; 348/725; 348/726
[58] Field of Search ................................ 348/725, 729, 348/726, 731–735, 737, 738; 358/695, 188, 189, 191.1, 195.1, 198, 197, 172; 455/43, 3.2, 205, 214, 311; H04N 5/44, 5/46, 5/50, 5/60, 5/18, 7/20

[56] References Cited

U.S. PATENT DOCUMENTS

| | | |
|---|---|---|
| 3,898,379 | 8/1975 | Howe et al. |
| 3,978,284 | 8/1976 | Yoshino ................................. 358/172 |
| 4,415,929 | 11/1983 | Yoshisato ............................. 358/172 |
| 4,953,179 | 8/1990 | Mita ...................................... 358/172 |
| 5,019,910 | 5/1991 | Filmer ................................... 358/188 |

FOREIGN PATENT DOCUMENTS

| | | |
|---|---|---|
| 2615680A1 | 11/1988 | France . |
| 2311230B2 | 7/1974 | Germany . |
| 1213074 | 8/1989 | Japan . |
| 3289876 | 12/1991 | Japan . |
| 451674 | 2/1992 | Japan . |

OTHER PUBLICATIONS

A Satellite Broadcasting Receiver (Part 2, desirable performance; The Radio Technical Association.

*Primary Examiner*—James J. Groody
*Assistant Examiner*—Sherrie Hsia
*Attorney, Agent, or Firm*—Stevens, Davis, Miller & Mosher

[57] ABSTRACT

The present invention relates to a satellite television broadcasting receiver which receives waves from a satellite, selects a broadcasting channel and obtains an FM demodulated video signal by passing a selected signal through the band-pass filter. In this satellite television broadcasting receiver, the video signal superposed with a large energy dispersion signal is inputted to the first clamping circuit at a low level, to eliminate the energy dispersion signal. Thus, a room is provided in the dynamic range of the amplifier at the later stage and the DG and DP of the amplifier at the later stage are maintained at a satisfactory level by the second clamping circuit. As a result, even in the case of a satellite television broadcasting in which the level of the energy dispersion signal superposed on the video signal is large, distortion which occurs due to the nonlinearity of the amplifier can be reduced substantially so that the image can be reproduced on the screen in a satisfactory condition without an interference of flickering.

2 Claims, 5 Drawing Sheets

SATELLITE TELEVISION BROADCASTING RECEIVER INCLUDING IMPROVED CLAMPING CIRCUIT

This application is a continuation of application Ser. No. 08/286,226, filed Aug. 5, 1994 (abandoned), which is a continuation of application Ser. No. 07/897,676, filed Jun. 12, 1992 (abandoned).

BACKGROUND OF THE INVENTION

The present invention relates to a satellite television broadcasting receiver to be used for receiving satellite television broadcasting in accordance with a communication satellite or a broadcasting satellite.

In recent years, communication services utilizing communications satellites (CS) have been extensively provided. A satellite television broadcasting receiver which is used for the purpose of receiving pictures and television broadcasting programs offered by utilizing satellites has basically the same structure as that of the receiver for receiving television broadcasting programs according to a broadcasting satellite, as shown in FIG. 3.

Figure 3:
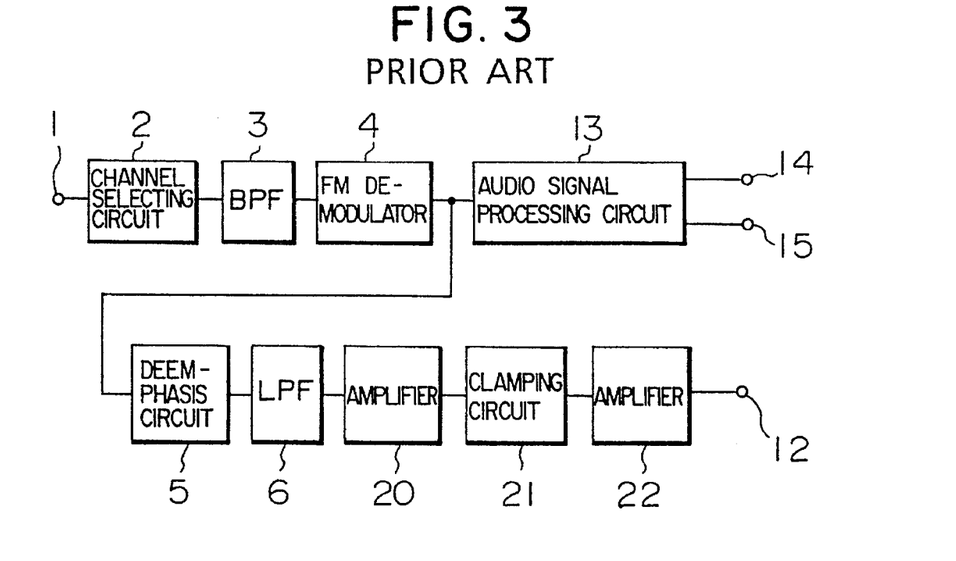
FIG. 3 is a block diagram for showing the conventional satellite television broadcasting receiver.

Referring to FIG. 3, 1 designates an input terminal for inputting a first intermediate frequency signal. The input terminal 1 frequency converts radio waves of a 12 GHz band which have been received from a satellite by an antenna into a frequency of 1 GHz band by a down converter, and applies a first intermediate frequency signal guided indoors by a coaxial cable. 2 designates a channel selecting circuit for receiving signals of one channel by selecting one broadcasting station out of multiple of first intermediate frequency signals. 3 designates a band-pass filter for passing only one wave out of output signals of the channel selecting circuit 2. 4 designates an FM demodulator for demodulating an FM signal, which is an output signal of the band-pass filter 3. 5 designates a deemphasis circuit for deemphasizing a demodulator output signal which is an output of the FM demodulator 4. 6 designates a low-pass filtering circuit for passing therethrough only a video signal. 20 designates a first amplifier for amplifying the output signal of the low-pass filtering circuit 6. 21 designates a clamping circuit for removing an energy dispersion signal included in the output signal of the first amplifier 20. 22 designates a second amplifier for amplifying the output of the clamping circuit 21. 12 designates a video signal output terminal for outputting the output signal of the second amplifier 22. 13 designates an audio signal processing circuit for outputting an audio signal from a demodulator output signal which is an output of the FM demodulator 4. 14 and 15 designate audio signal output terminals for outputting output signals of the audio signal processing circuit 13.

The operation of the satellite television broadcasting receiver having the above-described structure will be explained below. A first intermediate frequency signal, guided indoors by a coaxial cable, which has been obtained by frequency converting the waves of 12 GHz band received by the antenna from the satellite into the frequency of 1 GHz by the down converter, is applied to the input terminal 1. By selecting one broadcasting station by the channel selecting circuit 2, signals of only one channel are received out of multiple first intermediate frequency signals. Out of the signals selected through the channel selection by the channel selecting circuit 2, only one wave is passed by the band-pass filter 3. A SAW filter is generally used for the band-pass filter 3. The FM demodulator 4 demodulates the FM signal of the selected channel, to obtain a demodulator output signal. The audio signal processing circuit 13 demodulates an audio signal which has been QPSK modulated in the subcarrier of 5.7 MHz from the demodulator output signal. After PCM demodulation of the signal, the audio signal processing circuit 13 converts a digital signal into an analog signal by a D/A converter, and outputs the audio signal to the audio signal output terminals 14 and 15 respectively through a low-pass filter. The demodulator output signal of the FM demodulator 4 is inputted to the deemphasis circuit 5 to flatten the frequency characteristics of the signal that has been preemphasized by the transmitter. The signal that has been flattened by the deemphasis circuit 5 is inputted to the low-pass filtering circuit 6 so that only the image signal is passed and outputted by the low-pass filtering circuit 6.

Figure 4:
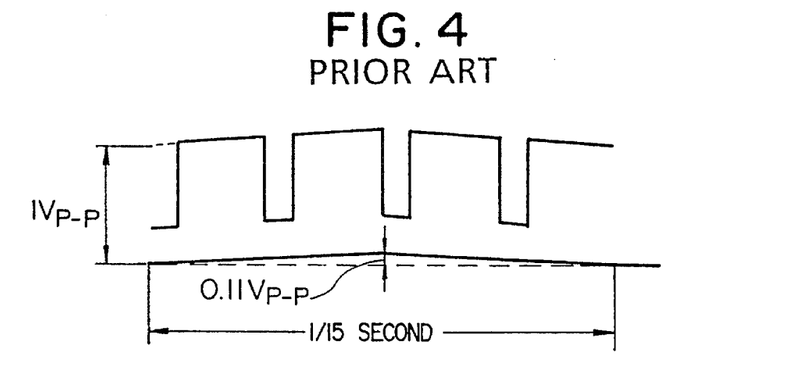
FIG. 4 is a waveform diagram for showing an image signal on which the energy dispersion signal of which frequency shift is 600 kHzp-p has been superposed.

The spectrum of the FM demodulator by the video signal becomes such that energy is concentrated around the frequency corresponding to a pedestal level or a synchronizing signal level which have a large time factor in the video signal level, having a peak of electric power in this energy concentrated region. Since this peak interferes with the microwave circuits, such as telephone lines, the WARC-BS has prescribed that the power flux density of satellite broading waves is lowered by 22 dB in the band width per 4 KHz. This is called energy dispersion which is achieved by superposing a triangular wave synchronous with the frame frequency on the video signal. In the case of a satellite television broadcasting according to a broadcasting satellite, the frequency shift of the energy dispersion signal is 600 KHzp-p and the repetition frequency of the energy dispersion signal is 15 Hz. Since the frequency shift of the main carrier is 17 MHzp-p, the level of the energy dispersion signal which is superposed on the video signal 1 Vp-p becomes 0.11 Vp-p when the preemphasis applied to the video signal is taken into account. FIG. 4 shows the state of the video signal on which the energy dispersion signal has been applied in the case of television broadcasting according to a broadcasting satellite. (reference document: A Satellite Broadcasting Receiver (Part 2, desirable performance); The radio engineering and electronics association).

Figure 5:
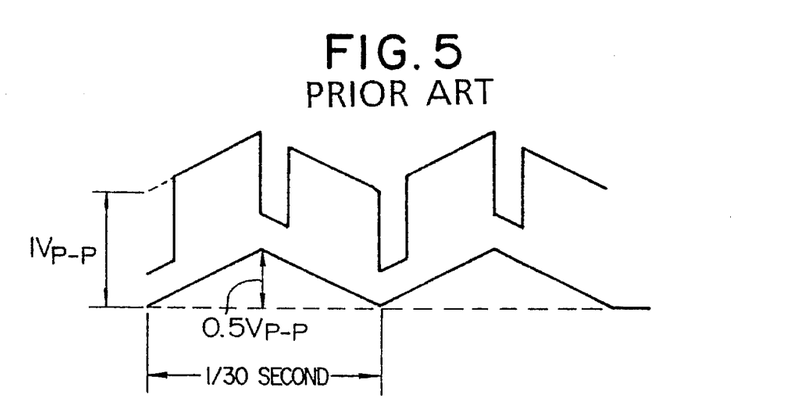
FIG. 5 is a waveform diagram for showing the image signal on which the energy dispersion signal whose frequency shift is 3 MHzp-p has been superposed.

In the meantime, in recent years, there have been various schedules for carrying out television broadcasting by using communications satellites. In this case, severer conditions have been prescribed for these communications than those for a satellite broadcasting. In the case of a television broadcasting in Japan based on a communications satellite, the frequency shift of the energy dispersion signal is in the range from about 2 MHzp-p to about 3 MHzp-p and the repetition frequency of the energy dispersion signal is a triangular wave of 30 Hz. Since the frequency shift of the main carrier is different depending on the satellite, the level of the energy dispersion signal superposing on the video signal 1 Vp-p is about 0.5 Vp-p at maximum when the preemphasis applied to the video signal is taken into account. FIG. 5 shows a state of the video signal on which the energy dispersion signal is superposed in the case of television broadcasting according to a communications satellite.

On the image signal which has been FM demodulated, deemphasized and passed through the low-pass filter, the energy dispersion signal has been kept superposed. When the video signals are reproduced on the screen in this state, a flickering interference occurs on the signal.

When the output signal of the low-pass filtering circuit 6 is applied as an input, the first amplifier 20 amplifies the signal to 2 Vp-p in the level of the image signal excluding the portion of the energy dispersion signal and produces the result as an output. The clamping circuit 21 eliminates the energy dispersion signal which has been superposed on the video signal and applies a DC bias to the second amplifier 22. The second amplifier 22 is a buffering circuit in which the voltage gain is 1. A DC bias of satisfactory DG and DP is set by the clamping circuit 21 and the video signal of 1 Vp-p is outputted in the terminal value of 75Ω from the video signal output terminal 12.

SUMMARY OF THE INVENTION

According to the above-described structure, however, the level of the energy dispersion signal which is superposed on the image signal 1 Vp-p is about 0.5 Vp-p at maximum in the case of television broadcasting according to a communications satellite. Thus, in the case of receiving a television broadcasting according to a communications satellite, the value between the peaks of the video signal on which the energy dispersion signal has been superposed is larger than that in the case of a broadcasting satellite. As a result, a distortion occurs because of the nonlinearity of the first amplifier. Even if the energy dispersion signal can be completely removed by the clamping circuit, a flickering interference occurs on the screen of the reproduced picture due to this distortion.

Figure 1:
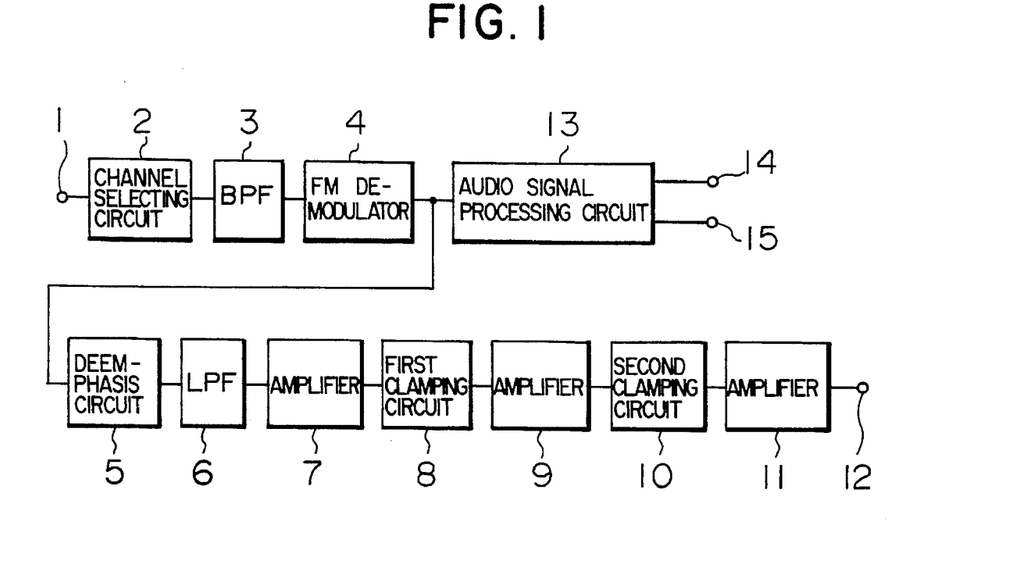
FIG. 1 is a block-diagram for showing the satellite television broadcasting receiver according to one embodiment of the present invention.

As the energy dispersion signal eliminating unit for the satellite television broadcasting receiver which is used for receiving television broadcasting services according to a communications satellite, the inventors of the present invention have made a proposal to insert a clamping circuit into two portions of the video signal processing circuit, as shown in FIG. 1. Description will now be made of the apparatus for eliminating the energy dispersion signal, with reference to the drawings. FIG. 1 shows a diagram of the receiving system for the satellite television broadcasting receiver. Referring to FIG. 1, 1 designates an input terminal for inputting a first intermediate frequency signal, 2 a channel selecting circuit, 3 a band-pass filter (BPF), 4 an FM demodulator, 5 a deemphasis circuit, 6 a low-pass filter (LPF), 7 a first amplifier, 8 a first clamping circuit, 9 a second amplifier, 10 a second clamping circuit, 11 a buffer amplifier, 12 a video signal output terminal, 13 an audio signal processing circuit, and 14 and 15 audio signal output terminals (R, L). The first and second clamping circuits 8 and 10 and the second amplifier 9 structure an energy dispersion signal eliminating unit.

The operation of the energy dispersion signal eliminating unit for a satellite television broadcasting receiver having the above-described structure will now be explained. Waves of a 12 GHz band from the satellite received by a parabolic antenna are frequency converted into a 1 GHz band by the down converter, and a first intermediate frequency signal guided indoors by a coaxial cable is applied to the input terminal 1. The channel selecting circuit 2, having the function of receiving signals of only one channel out of multiple first intermediate frequency signals by selecting one broadcasting station, produces a second intermediate frequency signal having 402.78 MHz as the center frequency. The band-pass filter 3 is a filter for passing only one wave of television signals which have been FM modulated by the channel filter. A SAW filter or the like is generally used for the band-pass filter 3. The FM demodulator 4 demodulates the FM signal of the selected channel, to obtain a wave-detected output signal. The audio signal processing circuit 13 demodulates the audio signal which has been QPSK modulated into a subcarrier of 5.7 MHz and processes the interleave, range bit and control signal which are the PCM decoding processings. The D/A converter converts the digital signal into an analog signal and outputs the audio base band signals (R, L) to the output terminals 14 and 15 through the LPF.

The wave-detected output signal which has been FM demodulated by the FM demodulator 4 is inputted to the deemphasis circuit 5 to flatten the frequency characteristics of the video signal. This signal is inputted to the low-pass filter (LPF) 6 to eliminate noises included in sound subcarriers and in the high band. The first amplifier 7 is applied with the output signal of the LPF 6 and amplifies this input data to a level necessary for operating the first clamping circuit 8, and then outputs the result. The first clamping circuit 8 eliminates the energy dispersion signal which has been superposed on the video signal by the peak clamping operation and outputs the video signal. The second amplifier 9 amplifies the output signal level of the first clamping circuit 8 to 2 Vp-p and produces an output of the result. The second clamping circuit 10 eliminates the energy dispersion signal by the peak clamping operation in the same manner as the first clamping circuit. The buffer amplifier 11 is an amplifier of which voltage gain is 1, and is an impedance converter for outputting the video signal of 1 Vp-p in the terminal value of 75Ω from the video signal output terminal 12.

Figure 8:
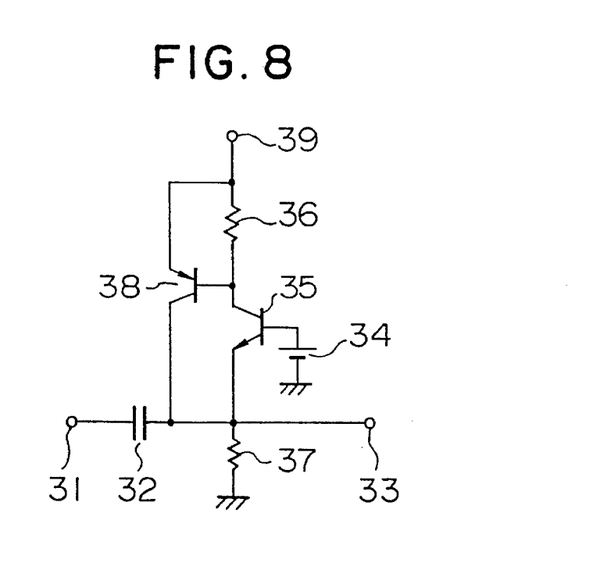
FIG. 8 is a circuit diagram for showing the peak clamping circuit which structures a part of the energy dispersion signal eliminating unit according to one embodiment of the present invention.

The first and second clamping circuits 8 and 10 are structured by a peak clamping circuit as shown in FIG. 8. Referring to FIG. 8, 31 designates a signal input terminal, 32 a capacitor, 33 a signal output terminal, 34 a voltage power source, 35 and 38 transistors, 39 a power source terminal and 36 and 37 resistors. The operation of the peak clamping circuit will be explained below. The DC component of the video signal inputted to the signal input terminal 31 is eliminated by the capacitor 32. Since a voltage is fixed to the base terminal of the transistor 35 by the DC voltage power source 34, the emitter voltage of the transistor 35 is lowered by the video signal inputted. When the voltage between the base and the emitter becomes higher than 0.6 V, the transistor 35 is rendered conductive. Since the capacitor 32 is charged, the emitter voltage of the transistor is fixed. When the emitter voltage of the transistor 35 increases by the video signal inputted and the voltage between the base and the emitter becomes lower than 0.6 V, the transistor 35 is rendered nonconductive. The transistor 38 and the resistor 36 structure a feedback circuit so that the operation characteristics when the transistor 35 shifts to a nonconductive state are improved. For this reason, the peak clamping circuit is called a feedback type peak clamping circuit. In this way, the voltage of a peak value at the low potential side of the video signal is peak clamped in the signal output terminal 33.

The BS has a small frequency shift of 600 kHz for the energy dispersion signal. Therefore, the normal clamping circuit 10 by itself has sufficient capacity for removing the energy dispersion signal. However, energy dispersion signals of about five times larger than that of the BS are superposed in the CS as described above, so that only improving the capacity of the clamping circuit is not sufficient. In other words, the second amplifier 9 needs to amplify the video signal to 2 Vp-p and handles a video signal of substantially large amplitude superposed with a triangular wave. Therefore, due to the influence of the nonlinearity of the second amplifier 9, the amplitude of the video signal is different between portions of a peak and a trough of the triangular wave. The video signal in which such a distortion has occurred has a flickering interference even if the energy dispersion signal has been eliminated completely by the clamping circuit 10. In recent years, the video signal processing circuit has gradually come to be integrated into an integrated circuit and the power source voltage has also gradually been in a reducing trend to minimize power consumption. Accordingly, distortions are very easy to occur in the signal when the signal is amplified to 2 Vp-p.

Now, by having the clamping circuit at two portions, the energy dispersion signal is removed by the first clamping circuit 8 which peak clamps while the video signal level is small and then the video signal is amplified to 2 Vp-p by the second amplifier, so that a sufficient room can be provided in the dynamic range. Accordingly, it is possible to avoid the occurrence of a distortion in the image signal due to the nonlinearity of the second amplifier 9. Further, a sufficient capacity of removing the energy dispersion signal can be obtained by the second clamping circuit 10.

In order to eliminate the conventional problem, it is an object of the present invention to provide a satellite television broadcasting receiver which can reproduce images in a satisfactory condition by eliminating a flickering interference that occurs due to the nonlinearity of the amplifier even in the case of a television broadcasting according to a communications satellite where the level of the energy dispersal signal superposing on the image signal is large.

In order to achieve the above object, the satellite television broadcasting receiver according to the present invention consists of a channel selecting circuit for receiving an input signal of a first intermediate frequency signal which is produced by frequency converting waves received from a satellite, a band-pass filter for having an output of the channel selecting circuit as an input and passing only a desired FM signal, an FM demodulator for having an output signal of the band-pass filter as an input, a deemphasis circuit for having a demodulator output signal of the FM demodulator as an input and deemphasizing a signal that has been preemphasized by the supplier, a low-pass filtering circuit for having an output of the deemphasis circuit as an input and passing only a video signal, a first amplifier for having an output of the low-pass filtering circuit as an input and amplifying this input, a first clamping circuit for having an output of the first amplifier as an input and clamping the signal, a second amplifier for having an output of the first clamping circuit as an input and amplifying the signal, a second clamping circuit for having an output of the second amplifier as an input and clamping the signal, and a buffer amplifier for having an output of the second clamping circuit as an input and amplifying the signal.

With the above-described structure, the satellite television broadcasting receiver of the present invention inputs to the first clamping circuit, at a low level, an image signal superposed with an energy dispersion signal which is larger than that of a broadcasting satellite, to eliminate the energy dispersion signal, and provides a room to the dynamic range of the later-stage amplifier to keep the DG and DP of the later-stage amplifier in a satisfactory condition in the second clamping circuit. Thus, even in the case of receiving a television broadcasting according to a communications satellite in which the level of the energy dispersion signal superposing on the image signal is large, it is possible to substantially reduce the distortion which occurs due to the nonlinearity of the amplifier and satisfactorily reproduce the video without receiving a flickering interference.

Further, in order to solve the above-described problem, the satellite television broadcasting receiver of the present invention includes a pulse extracting circuit for extracting a synchronizing signal of an input image signal which has been obtained by FM demodulating and deemphasizing the waves received from the satellite television broadcasting and then passing the waves through the low-pass filter, a switching circuit for clamping the image signal based on the output signal of the pulse extracting circuit, the pulse extracting circuit and the switching circuit forming a pulse clamping circuit, an amplifier for amplifying the output of the pulse clamping circuit, and a clamping circuit for having the output signal of the amplifier as an input and clamping the video signal.

With the above-described structure, according to the present invention, a video signal of the satellite television broadcasting that has been received and demodulated is deemphasized so that the frequency characteristics are flattened to be equivalent to those of the original signal, and the noise component of the wide band generated in the transmission system is eliminated by the low-pass filter. Then, the image signal is inputted to an energy dispersion signal eliminating unit consisting of the pulse clamping circuit, the amplifier and the peak clamping circuit so that the energy dispersion signal is eliminated. The image signal after having the energy dispersion signal eliminated is then impedance converted by the buffer amplifier and a low impedance is outputted in a drivable state.

In this case, a synchronizing signal necessary for pulse clamping is extracted, by the pulse extracting circuit, from the video signal which has been inputted to the energy dispersion signal eliminating unit. The synchronizing signal extracted is inputted to the switching circuit and the video signal is fixed to the reference voltage only during the pulse period of the synchronizing signal, to achieve the pulse clamping. The energy dispersion signal need not be completely eliminated, and it is important that no distortion occurs in the video signal due to the influence of nonlinearity of the amplifier connected to the next stage. The video signal has a sufficiently lower level than, for example, the level inputted to the peak clamping circuit at the later stage. Therefore, the pulse clamping circuit which does not apply any distortion to the video signal even at the low level is suitable.

The video signal which has been amplified to 2 Vp-p by the amplifier is inputted to the clamping circuit. Since the energy dispersion signal is finally sufficiently eliminated by this clamping circuit, it is possible to provide the energy dispersion signal eliminating unit which can be sufficiently used for the satellite television broadcasting according to the CS.

DESCRIPTION OF THE PREFERRED EMBODIMENTS

Referring to FIG. 1, 1 designates an input terminal of a first intermediate frequency signal, 2 a channel selecting circuit, 3 a band-pass filter, 4 an FM demodulator, 5 a deemphasis circuit, 6 a low-pass filtering circuit, 13 a voice signal processing circuit and 14 and 15 audio signal output terminals. The above components are the same as those in FIG. 3. 7 designates a first amplifier for amplifying an output signal of the low-pass filtering circuit 6. 8 designates a first clamping circuit for eliminating the energy dispersion signal included in the output signal of the first amplifier 7. 9 designates a second amplifier for amplifying the output signal of the first clamping circuit 8. 10 designates a second clamping circuit for DC reproducing the output signal of the second amplifier and applying a DC bias to a buffer amplifier 11. The buffer amplifier 11 buffer amplifies the output signal of the second clamping circuit 10. 12 designate a video signal output terminal for outputting an image signal which is the output signal of the buffer amplifier 11.

The operation of the satellite broadcasting receiver having the above-described configuration will be explained below with reference to FIG. 1. First, waves of a 12 GHz band from the satellite received by the antenna are frequency converted into a 1 GHz band by the down converter and then guided indoors by the coaxial cable to provide a first intermediate frequency signal. The first intermediate frequency signal is applied to the input terminal 1. Out of multiple first intermediate frequency signals received by the antenna, the channel selecting circuit 2 receives one channel by selecting one broadcasting station. Of the signal selected by the channel selecting circuit 2, only one wave is passed by the band-pass filter 3. A SAW filter or the like is generally used for the band-pass filter 3. The FM demodulator 4 demodulates the FM signal of the selected channel and obtains a demodulator output signal. The audio signal processing circuit 13 demodulates an audio signal, which has been obtained by QPSK modulating the demodulator output signal into a sub-carrier of 5.7 MHz, then PCM demodulates this voice signal, converts the digital signal into an analog signal by the D/A converter, and outputs the audio signal to the audio signal output terminals 14 and 15 through the low-pass filter respectively. The demodulator output signal of the FM demodulator is inputted to the deemphasis circuit 5 so that the signal preemphasized by the transmitter is restored to the original state by this circuit 5 by flattering the frequency characteristics. The signal of which frequency characteristics have been flattened by the deemphasis circuit 5 is inputted to the low-pass filtering circuit 6 so that only the video signal is passed and outputted by the low-pass filtering circuit 6. The first amplifier 7 amplifies the output video signal of the low-pass filtering circuit 6 to the level necessary for operating the clamping circuit 8, and then outputs the amplified video signal.

The first clamping circuit 8 eliminates the energy dispersion signal superposed on the video signal by the clamping operation, and outputs the video signal. The second amplifier 9 amplifies the output signal level of the first clamping circuit 8 to 2 Vp-p and outputs the amplified signal. The second clamping circuit 10 DC reproduces to apply a DC bias to the buffer amplifier 11. The buffer amplifier 11 is the buffering circuit of which voltage gain is 1. A DC bias of which DG and DP are satisfactory is set by the second clamping circuit 10 and the video signal of 1 Vp-p at a terminal value of 75Ω is outputted from the video signal output terminal 12.

Figure 2:
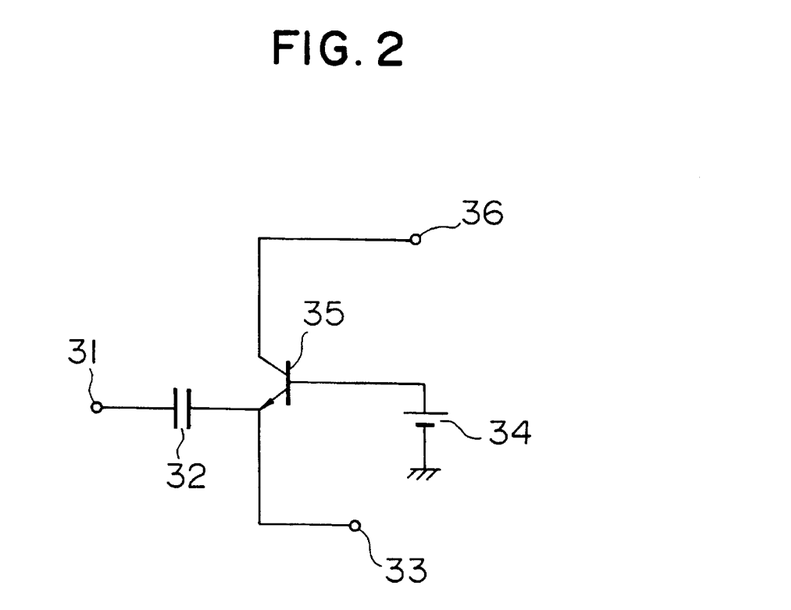
FIG. 2 is a circuit diagram for showing the clamping circuit.

FIG. 2 shows one example of the clamping circuit used in the first clamping circuit 8 and the second clamping circuit 10. Referring to FIG. 2, 31 designates an input signal terminal to which a signal is applied, 32 a capacitor one end of which is connected to the input signal terminal 31, 33 an output signal terminal, 34 a DC power source, 35 a transistor of which base is connected to the DC power source 34 and the emitter is connected to the other end of the capacitor 32 and the output signal terminal 33, and 36 a power source terminal. The DC component is cut off from the input signal applied to the signal input terminal 31, by the capacitor 32. When the difference of voltage between the one connected to the signal output terminal 33 of the capacitor 32 and the voltage of the DC power source 34, or the voltage between the base and the emitter of the transistor 35, becomes larger than 0.6 V because of the change of the amplitude of the input signal, the transistor 35 becomes conductive and the capacitor 32 is charged. As a result, at the signal output terminal 33, the DC potential of the peak value at the negative side of the input signal is clamped to the voltage which is about 0.6 V below the voltage of the DC power source 4.

As explained above, according to the present embodiment of the present invention, the satellite television broadcasting receiver includes the channel selecting circuit for having an input signal of a first intermediate frequency signal which is obtained by frequency converting the waves received from the satellite, the band-pass filter for having the output of the channel selecting circuit as an input and passing only a desired FM signal, the FM demodulator for inputting the output signal of the band-pass filter, the deemphasis circuit for having the demodulator output signal of the FM demodulator as an input and deemphasizing the signal which has been preemphasized by the transmitter, the low-pass filtering circuit for having the output of the deemphasis circuit as an input and passing only the video signal, the first amplifier for having the output of the low-pass filtering circuit as an input and amplifying this signal, the first clamping circuit for having the output of the first amplifier as an input and clamping this signal, the second amplifier for having the output of the first clamping circuit as an input and amplifying this signal, the second clamping circuit for having the output of the second amplifier as an input and clamping this signal, and the buffer amplifier for having the output of the second clamping circuit as an input and buffer amplifying this signal. With this arrangement, even in the case of the television broadcasting according to the communications satellite in which the level of the energy dispersion signal superposing on the video signal is large, the video signal on which the energy dispersion signal, larger than that according to the broadcasting satellite has been superposed is inputted to the first clamping circuit at a low level, to thereby eliminate the energy dispersion signal so that room is provided in the dynamic range of the amplifier at the later stage. The operating point of the buffer amplifier is decided by the second clamping circuit, to keep the DG and DP in a satisfactory condition. Thus, the influence of the nonlinearity of the amplifier can be reduced substantially and the image can be reproduced satisfactorily on the screen without having an interference of flickering.

As explained above, according to the present invention, the satellite television broadcasting receiver includes the channel selecting circuit for having an input signal of a first intermediate frequency signal which is obtained by frequency converting the waves received from the satellite, the band-pass filter for having the output of the channel selecting circuit as an input and passing only a desired FM signal, the FM demodulator for inputting the output signal of the band-pass filter, the deemphasis circuit for having the demodulator output signal of the FM demodulator as an input and deemphasizing the signal which has been preemphasized by the transmitter, the low-pass filtering circuit for having the output of the deemphasis circuit as an input and passing only the video signal, the first amplifier for having the output of the low-pass filtering circuit as an input and amplifying this signal, the first clamping circuit for having the output of the first amplifier as an input and clamping this signal, the second amplifier for having the output of the first clamping circuit as an input and amplifying this signal, the second clamping circuit for having the output of the second amplifier as an input and clamping this signal, and the buffer amplifier for having the output of the second clamping circuit as an input and buffer amplifying this signal. With the above arrangement, even in the case of the television broadcasting according to the communications satellite in which the level of the energy dispersion signal superposing on the video signal is large, the satellite television broadcasting receiver can be provided which substantially reduces the influence of the nonlinearity of the amplifier and reproduces the image on the screen in a satisfactory condition without an interference of flickering.

Figure 6:
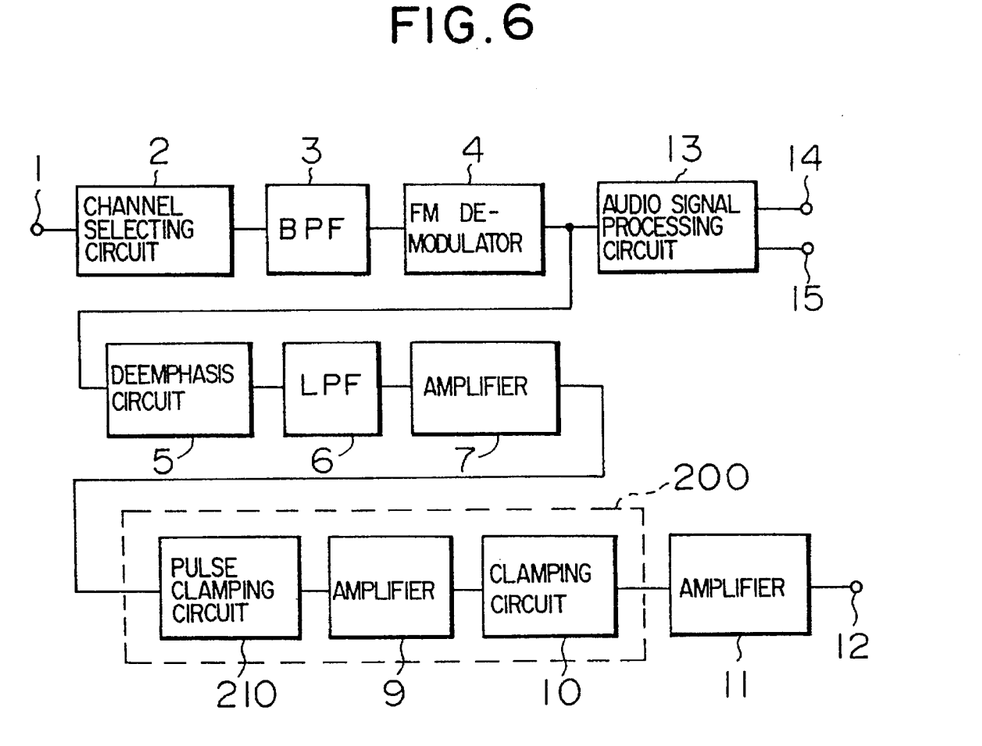
FIG. 6 is a diagram for showing the receiving system of the satellite television broadcasting receiver including the energy dispersion signal eliminating unit according to one embodiment of the present invention.

A second embodiment of the present invention will be explained with reference to the drawings. FIG. 6 is a block diagram for showing the receiving system of the satellite television broadcasting receiver according to the second embodiment of the present invention. Referring to FIG. 6, 1 designates an input terminal for inputting a first intermediate frequency signal, 2 a channel selecting circuit, 3 a band-pass filter, 4 an FM demodulator, 5 a deemphasis circuit, 6 a low-pass filter (LPF), 7 a first amplifier, 11 a buffer amplifier, 12 a video signal output terminal, and 14 and 15 voice signal output terminals (R, L), all of which have the same functions as those of FIG. 1.

200 designates an energy dispersion signal eliminating unit, which consists of a pulse clamping circuit 210 which has an input of the video signal outputted from the first amplifier 7, extracts a synchronization signal from this video signal and fixes the video signal to a reference signal only during the pulse period of the synchronization signal by using this synchronizing signal, a second amplifier 9 for amplifying the output signal of the clamping circuit 210 and a clamping circuit 10 for clamping the video signal outputted from the second amplifier 9. The second amplifier 9 and the clamping circuit 10 are the same as those of the prior art technique.

Figure 9:
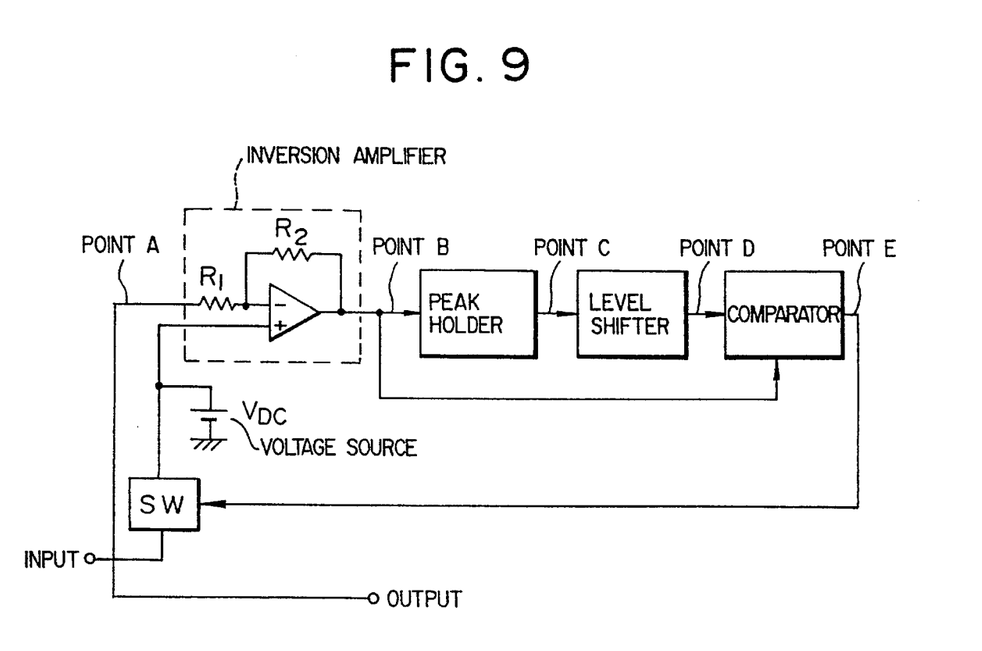
FIG. 9 is a configuration diagram for showing the pulse clamping circuit which is used in the present invention.
Figure 10:
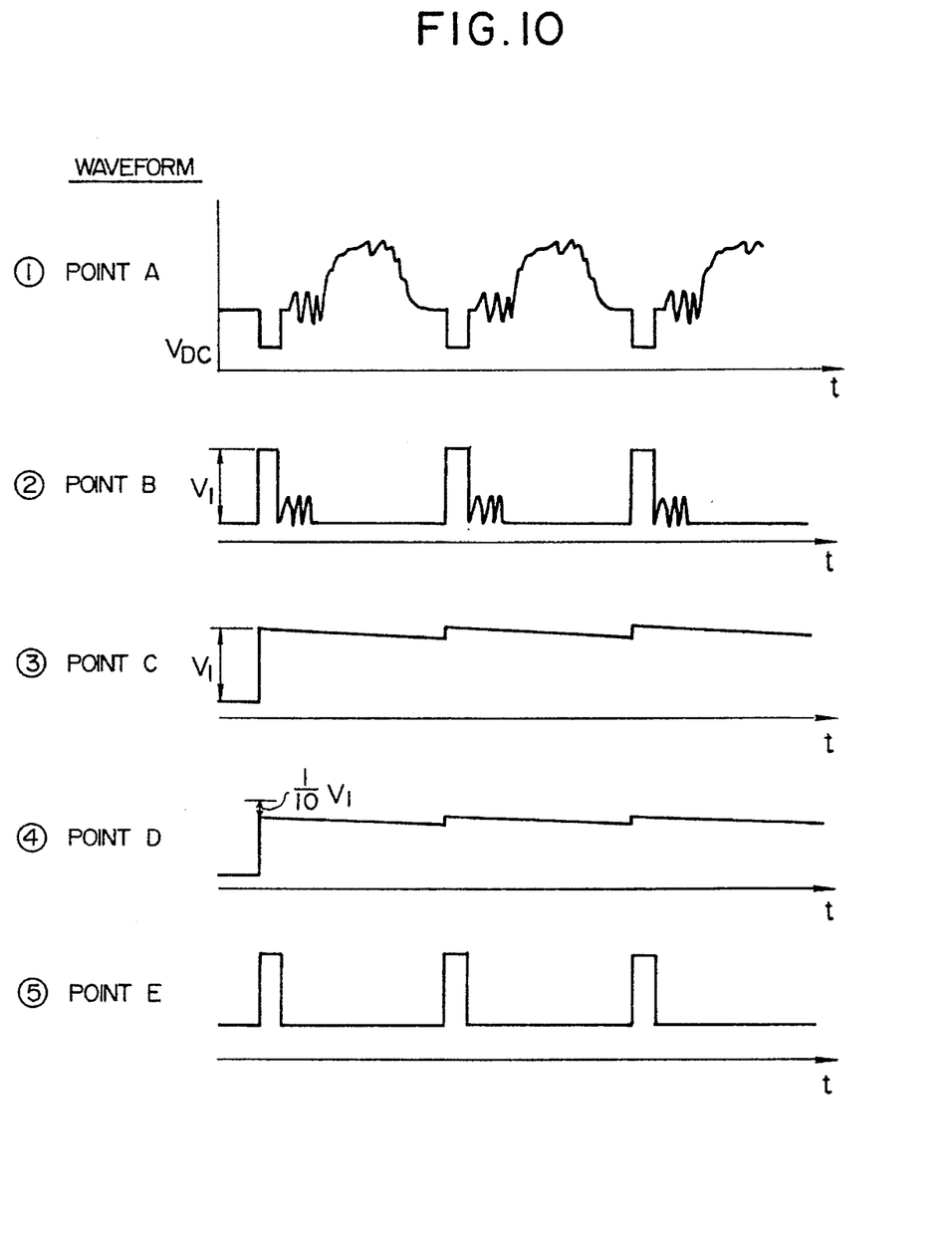
FIG. 10 is a diagram for showing the waveform of each portion of the pulse clamping circuit shown in FIG. 1.

As shown in FIG. 9, the pulse clamping circuit 210 is structured by an inversion amplifier, a pulse detecting part consisting of a peak holder, a level shifter and a comparator, a voltage source and a switch. The operation of the pulse clamping circuit 210 will be explained with reference to FIG. 10. When a video signal as shown in a waveform diagram ① is inputted to the input terminal, the video signal is inversion amplified by the inversion amplifier. Since the reference voltage of this inversion amplifier is a clamp voltage of the tip of a synchronizing signal level, the output of the inversion amplifier takes an amplified pattern of the synchronizing pulse portion and a part of the burst signal as shown in a waveform diagram ②. When the output of the inversion amplifier is provided to the peak holder, the waveform as shown in a waveform diagram ③ is obtained. In order to detect only the synchronizing pulse of the waveform, the DC level of the peak hold voltage is shifted by about ¹⁄₁₀ as shown in a waveform ④. With the above DC level-shifted voltage as a referenced voltage of the comparator, this reference voltage is compared with the output of the inversion amplifier (waveform diagram ②) by the comparator, to obtain the output which shows the detection of only the synchronizing pulse portion as shown in a waveform ⑤. Based on the output of the comparator, the switch for applying the clamp voltage is controlled and the tip of a synchronizing signal level of the input signal is clamped to the DC voltage of the voltage source.

The operation of the energy dispersion signal eliminating unit of the satellite television broadcasting receiver having the above-described configuration will be explained below. Waves of a 12 GHz band received from the satellite by the parabolic antenna are frequency converted into a 1 GHz band by the down converter and guided indoors by the coaxial cable to obtain a first intermediate frequency signal. The first intermediate frequency signal is applied to the input terminal 1. The channel selecting circuit 2 receives a signal of only one channel selected from multiple first intermediate frequency signals, and produces a second intermediate frequency signal having 402.78 MHz as a center frequency. The band-pass filter 3 is a filter for passing only one wave of the television signal which has been FM modulated by the channel filter. A SAW filter or the like is generally used for the band-pass filter 3. The FM demodulator 4 demodulates the FM signal of the selected broadcasting station and obtains a demodulator output signal. The audio signal processing circuit 13 demodulates the audio signal which has been QPSK modulated into the sub-carrier of 5.7 MHz and processes the interleave, range bit and control signal which are the PCM demodulating processings. The audio signal processing circuit 13 also converts the digital signal into an analog signal by the D/A converter and outputs audio base band signals (R, L) to the output terminals 14 and 15 through the LPF. The above operations are the same as those of the above-identified technique.

The demodulator output signal which has been FM demodulated by the FM demodulator 4 is inputted to the deemphasis circuit 5, to flatten the frequency characteristics of the video signal. This signal is inputted to the low-pass filter (LPF) 6 of which the cut-off wavelength is 4.5 MHz, to eliminate noises included in the sound sub-carrier and the high band. The output signal of the LPF 6 is inputted to the first amplifier 7 and is amplified to the level which requires the operation of the pulse clamping circuit 210. The amplified signal is then outputted. The pulse clamping circuit 210 clamps the pulse to eliminate the energy dispersion signal superposed on the video signal and outputs the video signal. The second amplifier 9 amplifies the output signal level of the pulse clamping circuit 210 to 2 Vp-p and outputs the amplified signal. The clamping circuit 10 eliminates the energy dispersion signal by the peak clamping operation.

The buffer amplifier 11 is an amplifier of which voltage gain is 1, and is an impedance converter for outputting the video signal of 1 Vp-p at the terminal value of 75Ω from the video signal output terminal 12.

Figure 7:
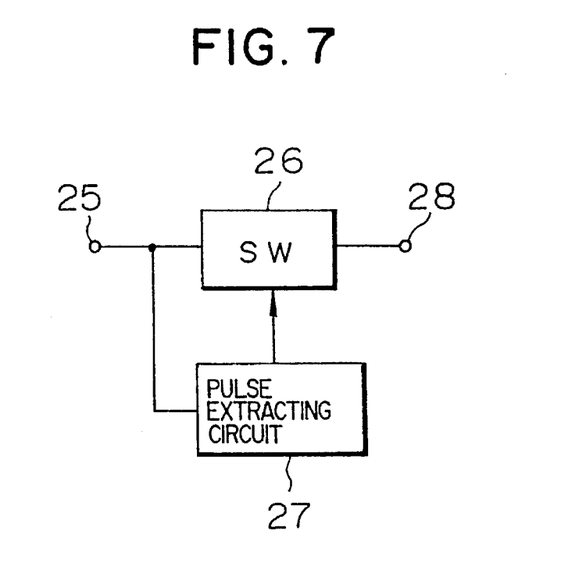
FIG. 7 is a block diagram for showing the pulse clamping circuit which structures a part of the energy diffusion signal eliminating unit according to one embodiment of the present invention.

FIG. 7 shows an example of the configuration of the pulse clamping circuit 210. Referring to FIG. 7, 25 designates an input terminal of the image signal, 26 a switching circuit, 27 a pulse extracting circuit and 28 an output terminal of the video signal. The operation of the pulse clamping circuit 210 will be explained below. A synchronizing signal is extracted from the video signal inputted to the video signal input terminal 25, by the pulse extracting circuit 27. By this synchronizing signal, the switching circuit 26 is rendered to be conductive during the synchronizing pulse period, and the switching circuit is rendered nonconductive in other conditions. While the switching circuit 26 is conductive, the level of the video signal is fixed to the reference voltage during the period of the synchronizing signal. During the nonconductive period, the video signal is separated from the reference voltage and there is no influence. Thus, the video signal is clamped to the reference voltage. In the pulse extracting circuit 27, the synchronizing signal can be extracted more stably when the video signal level is larger. Even if the output signal level of the pulse clamping circuit 210 is about 20 dB smaller than 2 Vp-p by integrating this circuit into an IC, there occurs no particular problem in the temperature characteristics and others. Although the circuit scale of the pulse clamping circuit becomes relatively larger than that of the peak clamping circuit, this is not a problem when the pulse clamping circuit is integrated into an IC. In the pulse clamping circuit 210, it is not necessary to completely eliminate the energy dispersion signal. There is no problem as long as no non-linear distortion occurs due to the energy dispersion signal which is a triangular wave of 15 Hz in the second amplifier 9 of the next stage. About 15 to 20 dB is suitable for the gain of the second amplifier 9 to avoid the occurrence of a problem of non-linear distortion.

FIG. 8 shows an example of the configuration of the clamping circuit 10. In this example, the clamping circuit is achieved by the peak clamping system. As compared with the pulse clamping circuit, the clamping circuit 10 has a smaller circuit structure but has a sufficient capacity of eliminating the energy dispersion signal because of a large input level of the video signal. The clamping circuit 10 may have the same configuration as that of the pulse clamping circuit 21.

As described above, with the clamping circuits provided at two portions, the energy dispersion signal is eliminated by the pulse clamping circuit, while the video signal level is small, by not applying a distortion to the video signal. Then the video signal is amplified to 2 Vp-p by the second amplifier 9, so that room can be provided in the dynamic range. Accordingly, it is possible to avoid the occurrence of a distortion in the video signal due to the nonlinearity of the second amplifier 9. Further, a sufficient capacity for eliminating the energy dispersion signal can be obtained by the second clamping circuit 10.

As described above, according to the present invention, a sufficient capacity for eliminating the energy dispersion signal can be obtained in the satellite television broadcasting according to the communications satellite in which the level of the energy dispersion signal superposed on the video signal is about five times larger than that of the broadcasting satellite.

We claim:

1. A satellite television broadcasting receiver comprising:
   a channel selecting circuit for receiving, as an input signal, a first intermediate frequency signal obtained by frequency converting a plural channel of radio waves received from a satellite and for frequency converting said first intermediate frequency signal into a second intermediate frequency signal such that a selected channel of the second intermediate frequency signal has a predetermined frequency;
   a band-pass filter for receiving said second intermediate frequency signal and for passing therethrough only a desired FM signal of said selected channel of said second intermediate frequency signal;
   an FM demodulator for demodulating the desired FM signal so as to obtain a pre-emphasized video signal which has been pre-emphasized at a transmitter;
   a de-emphasis circuit for de-emphasizing the pre-emphasized video signal;
   a low-pass filter, receiving an output signal of said de-emphasis circuit, for passing therethrough only a video signal;
   a first amplifier for amplifying said video signal from said low-pass filter and outputting an amplified video signal;
   a first clamping circuit for clamping the amplified video signal and outputting a clamped video signal;
   a second amplifier for amplifying the clamped video signal and outputting a second amplified video signal; and
   a second clamping circuit for clamping the second amplified video signal and outputting a second clamped video signal,
   wherein each of said first clamping circuit and said second clamping circuit has an input terminal and an output terminal and each comprises:
   a capacitor connected at a first end to said input terminal and connected at a second end to said output terminal;
   a DC power source; and
   a transistor having an emitter connected to said output terminal and a base connected to said DC power source.

2. A satellite television broadcasting receiver comprising:
   a channel selecting circuit for receiving, as an input signal, a first intermediate frequency signal obtained by frequency converting a plural channel of radio waves received from a satellite and for frequency converting said first intermediate frequency signal into a second intermediate frequency signal such that a selected channel of the second intermediate frequency signal has a predetermined frequency;
   a band-pass filter for receiving said second intermediate frequency signal and for passing therethrough only a desired FM signal of said selected channel of said second intermediate frequency signal;
   an FM demodulator for demodulating the desired FM signal so as to obtain a pre-emphasized video signal which has been pre-emphasized at a transmitter;
   a de-emphasis circuit for de-emphasizing the pre-emphasized video signal;
   a low-pass filter, receiving an output signal of said de-emphasis circuit, for passing therethrough only a video signal;
   a first amplifier for amplifying said video signal from said low-pass filter and outputting an amplified video signal;
   a pulse clamping circuit comprising:
   an input terminal receiving said amplified video signal from said first amplifier and an output terminal, a switching circuit connected to said input terminal and selectively providing a constant voltage to said amplified video signal that is input to said input terminal, in accordance with a control signal, an inversion amplifier receiving said amplified video signal and providing an output based on inversion amplifying the amplified video signal, a peak holder circuit for receiving said output of said inversion amplifier and providing an output representing a peak of said output of said inversion amplifier, a level shifter circuit for receiving said output of said peak holder circuit and shifting a level thereof by a given amount to obtain a level shifted output, and a comparator for comparing said level shifted output of said level shifter circuit to the output of said inversion amplifier and generating said control signal in response thereto;

a second amplifier for amplifying the video signal clamped by said switching circuit and outputting a second amplified video signal; and a clamping circuit for clamping the second amplified video signal output from said second amplifier so as to output a clamped video signal.

* * * * *